United States Patent
Weng et al.

(10) Patent No.: US 11,429,011 B2
(45) Date of Patent: Aug. 30, 2022

(54) OPTICAL SYSTEM

(71) Applicant: TDK TAIWAN CORP., Taoyuan (TW)

(72) Inventors: Chih-Wei Weng, Taoyuan (TW);
Liang-Ting Ho, Taoyuan (TW);
Chao-Chang Hu, Taoyuan (TW);
Chien-Yu Kao, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 170 days.

(21) Appl. No.: 16/745,826

(22) Filed: Jan. 17, 2020

(65) Prior Publication Data

US 2021/0048604 A1  Feb. 18, 2021

Related U.S. Application Data

(60) Provisional application No. 62/887,905, filed on Aug. 16, 2019.

(30) Foreign Application Priority Data

Dec. 20, 2019  (EP) ..................................... 19218896

(51) Int. Cl.
*G02B 7/02* (2021.01)
*G03B 5/00* (2021.01)
(Continued)

(52) U.S. Cl.
CPC ............... *G03B 5/00* (2013.01); *G02B 7/021* (2013.01); *G02B 7/08* (2013.01); *G02B 7/09* (2013.01); *G02B 7/10* (2013.01); *G02B 9/62* (2013.01); *G02B 13/001* (2013.01); *G02B 13/0065* (2013.01); *G02B 27/646* (2013.01); *G03B 13/36* (2013.01); *H04N 5/2253* (2013.01); *H04N 5/2254* (2013.01); *H04N 5/2257* (2013.01); *H04N 5/23287* (2013.01);
(Continued)

(58) Field of Classification Search
CPC .......................... G02B 13/0065; G02B 13/007
See application file for complete search history.

(56) References Cited

U.S. PATENT DOCUMENTS

2011/0001789 A1*  1/2011  Wilson ................... H04N 5/232
                                                          348/36
2016/0044250 A1*  2/2016  Shabtay ............. G02B 13/0065
                                                        348/240.3
(Continued)

OTHER PUBLICATIONS

Hou et al., Ultra Slim Optical Zoom System Using Alvarez Freeform Lenses (2019), IEEE Photonics Journal, vol. 11 (Year: 2019).*

*Primary Examiner* — Ephrem Z Mebrahtu

(74) *Attorney, Agent, or Firm* — Muncy, Geissler, Olds & Lowe, P.C.

(57) ABSTRACT

An optical system is provided. The optical system includes a first optical module, a second optical module and a third optical module. The first optical module is configured to connect at least one first optical member. The second optical module is configured to connect at least one second optical member. The third optical module is configured to connect a third optical member, wherein the third optical module is located between the first optical module and the second optical module.

20 Claims, 3 Drawing Sheets

(51) Int. Cl.

| | |
|---|---|
| *G02B 9/62* | (2006.01) |
| *G02B 7/09* | (2021.01) |
| *G02B 13/00* | (2006.01) |
| *G02B 27/64* | (2006.01) |
| *H04N 5/225* | (2006.01) |
| *G02B 7/08* | (2021.01) |
| *H04N 5/232* | (2006.01) |
| *G03B 13/36* | (2021.01) |
| *G02B 7/10* | (2021.01) |

(52) U.S. Cl.
CPC ............... *G03B 2205/0007* (2013.01); *G03B 2205/0053* (2013.01); *G03B 2205/0069* (2013.01)

(56) References Cited

U.S. PATENT DOCUMENTS

| | | | |
|---|---|---|---|
| 2017/0108670 A1* | 4/2017 | Ko | G02B 9/60 |
| 2017/0359568 A1* | 12/2017 | Georgiev | H04N 5/2254 |
| 2018/0081149 A1* | 3/2018 | Bae | G02B 9/64 |
| 2019/0243112 A1* | 8/2019 | Yao | G02B 27/646 |

* cited by examiner

OPTICAL SYSTEM

CROSS REFERENCE TO RELATED APPLICATIONS

This application claims the benefit of U.S. Provisional Application No. 62/887,905, filed Aug. 16, 2019, and claims priority of European Patent Application No. 19218896.9, filed Dec. 20, 2019, the entirety of which are incorporated by reference herein.

BACKGROUND

Technical Field

The disclosure relates to an optical system, and in particular to an optical system including a plurality of optical members, wherein some of the optical members are movable relative to some of the other optical members.

Description of the Related Art

With the development of technology, many electronic devices (such as smartphones and digital cameras) nowadays perform the functions of a camera or video recorder. The use of such electronic devices has become increasingly widespread, and these electronic devices have been designed for convenience and miniaturization to provide users with more choices.

Electronic devices with a camera or video function usually have an optical system, and light may pass through an optical member disposed in the optical system and form an image on a photosensitive member. By means of driving the optical member to move, an autofocus (AF) and/or optical image stabilization (OIS) function is achieved.

However, the arrangement of the optical system may occupy certain space, limiting the design of the electronic devices. As a result, the size of the electronic devices is usually not good enough to meet the requirement for users. Therefore, how to solve the aforementioned problem has become an important topic.

BRIEF SUMMARY

The present disclosure provides an optical system. The optical system includes a first optical module, a second optical module and a third optical module. The first optical module is configured to connect at least one first optical member. The second optical module is configured to connect at least one second optical member. The third optical module is configured to connect a third optical member, wherein the third optical module is located between the first optical module and the second optical module.

In an embodiment, there are fewer first optical members than second optical members. In an embodiment, the first optical member has a first optical area on a plane that is perpendicular to the optical axis, the second optical member has a second optical area on the plane, and the first optical area is different from the second optical area. In an embodiment, the third optical member has a third optical area on the plane, and the third optical area is smaller than the first optical area and the second optical area.

In an embodiment, the optical system further includes a fourth optical module that is connected to a fourth optical member, wherein the first optical module is located between the third optical module and the fourth optical module, the fourth optical member has a fourth optical area on the plane, and the fourth optical area is greater than at least one of the first optical area and the second optical area.

In an embodiment, the fourth optical member has a first area on a plane that is perpendicular to the optical axis and has a second area on a plane that is parallel to the optical axis, and the first area is smaller than the second area. In an embodiment, the second area is greater than the second optical area.

In an embodiment, the first optical module is connected to a plurality of first optical members, one of the first optical members has a first material, another first optical member has a second material, and the first material is different from the second material. In an embodiment, the one first optical member is closer to the third optical module than the other first optical member, and the refractivity of the first material is less than the refractivity of the second material.

In an embodiment, there are more first optical members than second optical members. In an embodiment, the first optical member has a first optical area on a plane that is perpendicular to the optical axis, the second optical member has a second optical area on the plane, and the first optical area is greater than the second optical area. In an embodiment, the third optical member has a third optical area on the plane, and the third optical area is smaller than the first optical area.

In an embodiment, the optical system further includes a fourth optical module that is connected to a fourth optical member, wherein the first optical module is located between the third optical module and the fourth optical module, the fourth optical member has a fourth optical area on the plane, and the fourth optical area is greater than at least one of the first optical area and the second optical area.

In an embodiment, the fourth optical member has a first area on a plane that is perpendicular to the optical axis and has a second area on a plane that is parallel to the optical axis, and the first area is smaller than the second area. In an embodiment, the second area is greater than the second optical area.

In an embodiment, the first optical module is connected to a plurality of first optical members, one of the first optical members has a first material, another first optical member has a second material, and the first material is different from the second material. In an embodiment, the one first optical member is closer to the third optical module than the other first optical member, and the refractivity of the first material is less than the refractivity of the second material. In an embodiment, the shape of the first optical members is not exactly the same.

In an embodiment, the first optical module is movable relative to the second optical module, and the third optical module is connected to the first optical module. In an embodiment, the first optical module is movable relative to the second optical module, and the third optical module is connected to the second optical module.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical systems of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

In addition, relative terms such as "lower" or "bottom," "upper" or "top" may be used in the following embodiments in order to describe the relationship between one element and another element in the figures. It should be appreciated that if the device shown in the figures is flipped upside-down, the element located on the "lower" side may become the element located on the "upper" side.

It should be understood that although the terms "first," "second," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

Figure 1:
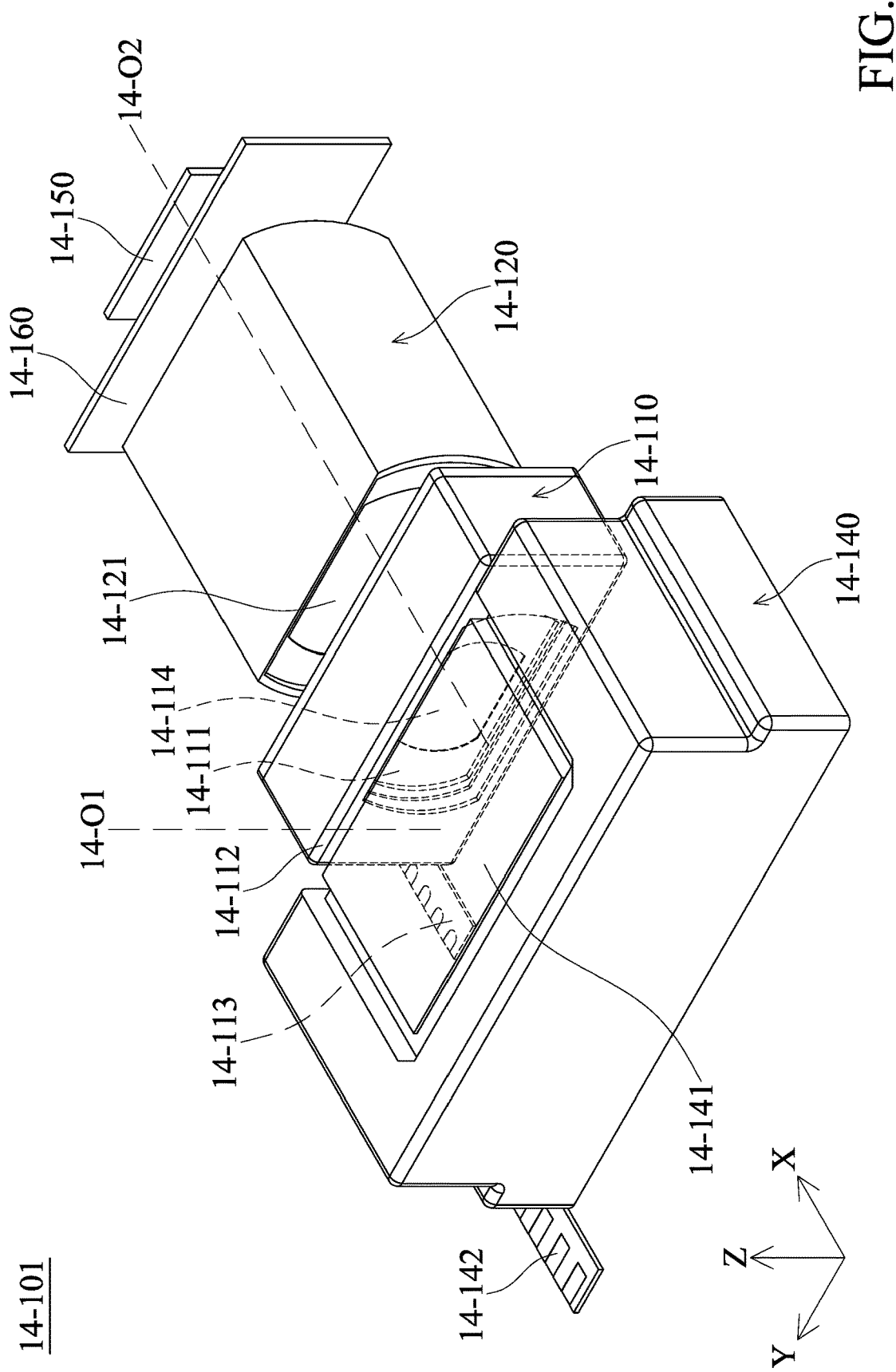
FIG. 1 is a perspective view illustrating an optical system in accordance with an embodiment of the present disclosure.

FIG. 1 is a schematic perspective view illustrating an optical system 14-101 in accordance with an embodiment of the present disclosure. It should be noted that, in this embodiment, the optical system 14-101 may be, for example, disposed in the electronic devices (not shown) with camera function, and a driving assembly inside the optical system may be configured to drive an optical member to move. Controlling the position of the optical member can perform an autofocus (AF) and/or optical image stabilization (OIS) function.

Figure 2:
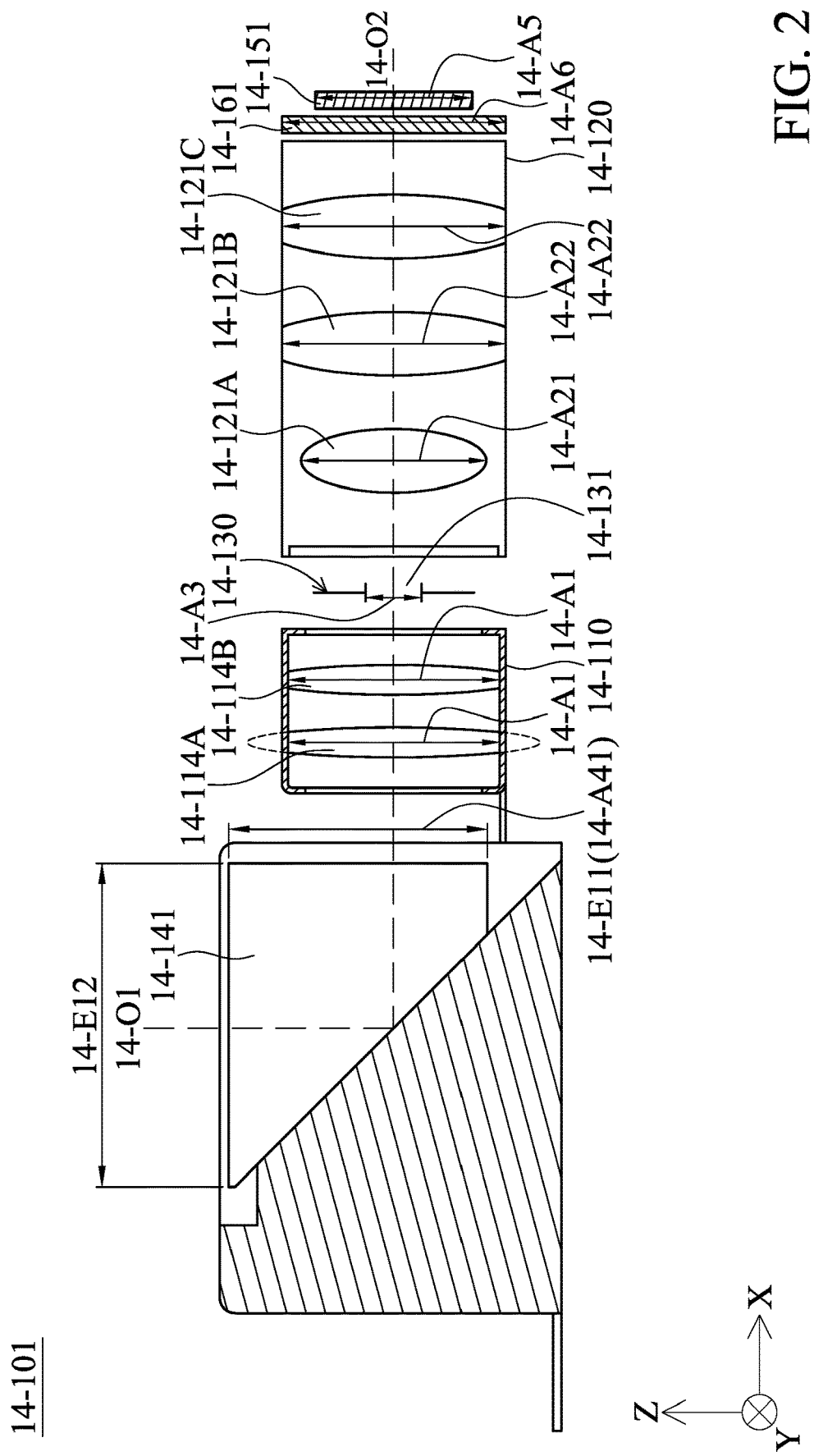
FIG. 2 is a cross-sectional view illustrating the optical system shown in FIG. 1.

As shown in FIG. 1, the optical system 14-101 includes a first optical module 14-110, a second optical module 14-120, a third optical module 14-130 (as shown in FIG. 2), a fourth optical module 14-140, a fifth optical module 14-150 and a sixth optical module 14-160, all of which correspond to each other. The optical system 14-101 has a first optical axis 14-O1, which is substantially parallel to the Z axis. The optical system 14-101 further has a second optical axis 14-O2, which is substantially perpendicular to the first optical axis 14-O1. After light enters the optical system 14-101 along the first optical axis 14-O1, the direction of the light is changed and the light travels along the second optical axis 14-O2. In some embodiments, the first optical axis 14-O1 is not parallel to the second optical axis 14-O2.

In the present embodiment, the fourth optical module 14-140 includes a driving assembly 14-142. Light may enter the fourth optical module 14-140 along the first optical axis 14-O1, and a fourth optical member 14-141 that is connected to the fourth optical module 14-140 may change the direction of the light which travels along the second optical axis 14-O2. The driving assembly 14-142 may drive the fourth optical member 14-141 to move, and thereby the path of the light may be adjusted, performing an autofocus (AF) and/or optical image stabilization (OIS) function.

After the light turns to the second optical axis 14-O2, it may pass through the first optical module 14-110, the second optical module 14-120, the sixth optical module 14-160 and the fifth optical module 14-150 in order. In other words, the fourth optical module 14-140, the first optical module 14-110, the second optical module 14-120, the sixth optical module 14-160 and the fifth optical module 14-150 are sequentially arranged along the second optical axis 14-O2. As a result, the shortest distance between the first optical module 14-110 and the fifth optical module 14-150 is longer than the shortest distance between the second optical module 14-120 and the fifth optical module 14-150. The sixth optical module 14-160 may be located between the fifth optical module 14-150 and the second optical module 14-120.

In some embodiments, the first optical module 14-110 includes a movable portion 14-111, a fixed portion 14-112 and a driving assembly 14-113, wherein the movable portion 14-111 is configured to connect the first optical member 14-114. The driving assembly 14-113 may drive the movable portion 14-111 to move relative to the fixed portion 14-112, and therefore performing an autofocus (AF) and/or optical image stabilization (OIS) function. The second optical module 14-120 is configured to connect the second optical member 14-121, wherein the second optical member 14-121 corresponds to the first optical member 14-114. For example, the second optical axis 14-O2 may pass through the first optical member 14-114 and the second optical member 14-121. The first optical member 14-114 is movable relative to the second optical member 14-121, and may thereby provide different optical characteristics, as required.

Since merely some of the optical members (such as the first optical member 14-114) are movable, the design of the driving assembly 14-113 may be simplified or the required space of the driving assembly 14-113 may be reduced, achieving the miniaturization of the optical system 14-101. Regarding the detailed arrangement of the first optical module 14-110, the second optical module 14-120 and the fourth optical module 14-140, it may be referred to other embodiments of the present disclosure, and it will not descripted in detail herein.

In some embodiments, an image sensor may be, for example, connected to the fifth optical module 14-150, and therefore the light entering the optical system 14-101 may form an image after reaching the fifth optical module 14-150. In some embodiments, a light filter may be connected to the sixth optical module 14-160, and therefore the optical characteristics of the optical system 14-101 may be improved. In some embodiments, the sixth optical module 14-160 is optional. In some embodiments, the sixth optical module 14-160 may be substituted as a shutter, or a shutter may be disposed between the sixth optical module 14-160 and the fifth optical module 14-150.

FIG. 2 is a cross-sectional view illustrating the optical system 14-101 shown in FIG. 1. As shown in FIG. 2, the third optical module 14-130 is located between the first optical module 14-110 and the second optical module 14-120, and is configured to connect a third optical module 14-131. In some embodiments, the third optical module 14-130 is connected to the first optical module 14-110 and movable relative to the second optical module 14-120. In some other embodiments, the third optical module 14-130 is connected to the second optical module 14-120, and the first optical module 14-110 is movable relative to the second optical module 14-120 and the third optical module 14-130.

It should be noted that the term "optical area" may be used in the following paragraphs and refers to the largest region (on the Y-Z plane) that light may pass through in each element. Although the present embodiment merely shows a cross-section view of the optical system 14-101, those skilled in the art should realize the proportional relationships between each "optical area" and "area" discussed in the present disclosure.

In the present embodiment, the fourth optical member 14-141 has a first area 14-E11 (i.e. a fourth optical area 14-A41) on a plane that is perpendicular to the second optical axis 14-O2 (namely, parallel to the first optical axis 14-O1). A second area 14-E12 is provided on a plane that is perpendicular to the first optical axis 14-O1 (namely, parallel to the second optical axis 14-O2). It should be noted that the first area 14-E11 is smaller than the second area 14-E12 because the fourth optical member 14-141 has a cutting portion below. By setting the cutting portion, the weight of the fourth optical member 14-141 can be reduced without affecting the optical properties, and the effect of reducing the weight of the optical system 14-101 can be achieved.

In addition, the size of the fourth optical module 14-140 may be greater than the sizes of the first optical module 14-110 and the second optical module 14-120. An electrical element (not shown) may be disposed below the first optical module 14-110 and the second optical module 14-120. That way, the space of the optical system 14-101 may be used more effectively. For example, the electrical element may be a battery, a capacitor, a resistor, an inductor or any other suitable electrical element.

The third optical module 14-130 is connected to the third optical member 14-131. For example, the third optical member 14-131 is an aperture, but the disclosure is not limited thereto. The third optical member 14-131 has a third optical area 14-A3 on a plane that is perpendicular to the second optical axis 14-O2. In the present embodiment, the third optical area 14-A3 is smaller than the fourth optical area 14-A4.

As shown in FIG. 2, the first optical module 14-110 is connected to two first optical members 14-114A and 14-114B. The first optical members 14-114A and 14-114B have a first optical area 14-A1. The fourth optical area 14-A41 is larger than the first optical area 14-A1, and the third optical area 14-A3 is smaller than the first optical area 14-A1. It should be understood that the first optical members 14-114A and 14-114B are cut in the present embodiment to remove redundant portions (such as the portion of the first optical member 14-114A shown as dotted lines) of the first optical members 14-114A and 14-114B. That way, the size of the first optical members 14-114A and 14-114B may be reduced without affecting the optical properties, and the miniaturization of the optical system 14-101 can be achieved.

In the present embodiment, the first optical member 14-114B is closer to the third optical module 14-130 than the first optical member 14-114A. For example, the material of the first optical member 14-114A includes glass, and the material of the first optical member 14-114B includes plastic, but they are not limited thereto. In some embodiments, the refractive index of the material of the first optical member 14-114B is smaller than the refractive index of the material of the first optical member 14-114A.

The second optical module 14-120 is connected to the second optical members 14-121A, 14-121B and 14-121C with different sizes. The second optical member 14-121A has a second optical area 14-A21, and the second optical members 14-121B and 14-121C have a second optical area 14-A22. In this embodiment, the first optical area 14-A1 is substantially equal to the second optical area 14-A22, and is greater than the second optical area 14-A21. The second optical members 14-121B and 14-121C also have at least one cutting portion to reduce the size of the second optical members 14-121A, 14-121B, and the miniaturization of the optical system 14-101 can be achieved. Since the second optical member 14-121A is not cut at all, the shape of the second optical member 14-121A is different from the shapes of the second optical members 14-121B and 14-121C in the present embodiment.

It should be understood that although two first optical members 14-114A, 14-114B and three second optical members 14-121A, 14-121B and 14-121C are shown in the present embodiment, but the present disclosure is not limited thereto. Those skilled in the art may adjust positions and numbers of the first optical members and the second optical members as required, as long as the number of the first optical members is less than the number of the second optical members.

In addition, although in this embodiment, the light passes through the first optical module 14-110 and then enters the second optical module 14-120, this merely serves as an example. Those skilled in the art may adjust the positions of the first optical module 14-110 and the second optical module 14-120 as required, so that light passes through the second optical member 14-121 before entering the first optical member 14-114.

A sixth optical member 14-161 may be connected to the sixth optical module 14-160 (as shown in FIG. 1), wherein the sixth optical member 14-161 has a sixth optical area 14-A6. In the present embodiment, the sixth optical area 14-A6 is substantially equal to the second optical area 14-A22. A fifth optical member 14-151 may be connected to the fifth optical module 14-150 (as shown in FIG. 1), wherein the fifth optical member 14-151 has a fifth optical area 14-A5. In this embodiment, the fifth optical area 14-A5 is smaller than the second optical area 14-A22. In other embodiments, the fifth optical area 14-A5 may be substantially equal to the second optical area 14-A22.

Figure 3:
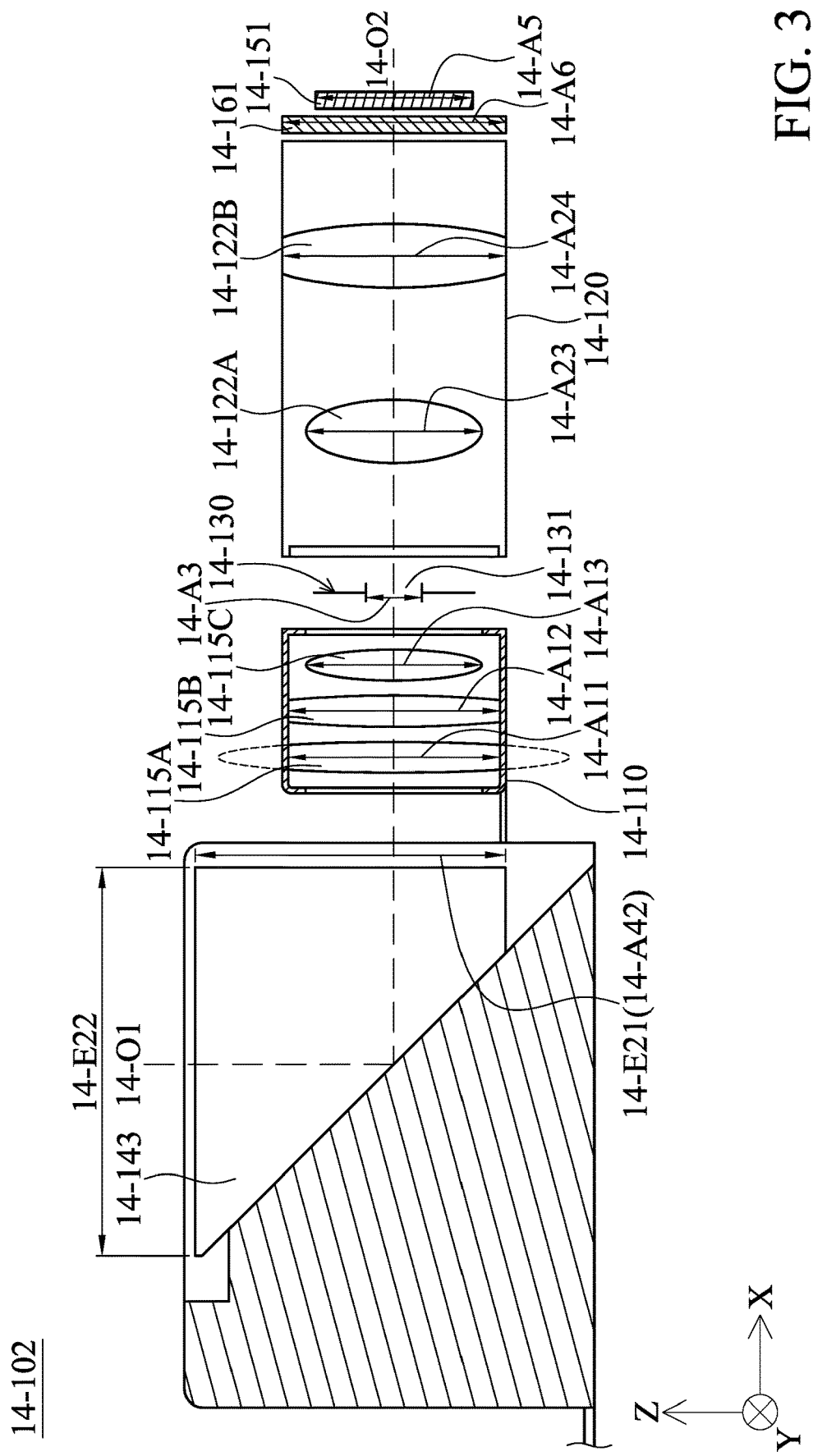
FIG. 3 is a cross-sectional view illustrating the optical system in accordance with another embodiment of the present disclosure.

FIG. 3 is a cross-sectional view illustrating an optical system 14-102 in accordance with another embodiment of the present disclosure. It should be noted that the optical system 14-102 may include the same or similar elements or portions as that of the optical system 14-101. These elements or portions will be labeled as the same or similar numerals, and will not be discussed in detail below. As shown in FIG. 3, the optical system 14-102 includes a fourth optical member 14-143, wherein the size of the fourth optical member 14-143 is larger than the size of the fourth optical member 14-141. In other words, the fourth optical area 14-A42 (i.e. the second area 14-E22) of the fourth optical member 14-143 may be greater than the fourth optical area 14-A41 of the fourth optical member 14-141. Similarly, since the fourth optical member 14-141 has a cutting portion below, the first area 14-E21 may be smaller than the second area 14-E22. Because the size of the fourth optical member 14-143 is larger than the size of the fourth optical member 14-141, the removed portion of the fourth optical member 14-143 also is larger than the removed portion of the fourth optical member 14-141.

As shown in FIG. 3, the first optical module 14-110 is connected to 14-115A, 14-115B and 14-115C with different sizes. The first optical member 14-121A has a first optical area 14-A11, the first optical member 14-121B has a first optical area 14-A12, and the first optical member 14-121C has a first optical area 14-A13. The first optical area 14-A11 is substantially equal to the first optical area 14-A12, which is greater than the first optical area 14-A13. The fourth optical area 14-A42 is larger than the first optical areas 14-A11, 14-A12 and 14-A13, and the third optical area 14-A3 is smaller than the first optical area 14-A11, 14-A12 and 14-A13. Since the first optical member 14-115C is not cut at all, the shape of the first optical member 14-115C that is closer to the third optical module 14-130 is different from the shapes of the first optical members 14-115A and 14-115B in the present embodiment.

It should be understood that the first optical members 14-115A and 14-115B are cut in the present embodiment to remove redundant portions (such as the portion of the first optical member 14-115A shown as dotted lines) of the first optical members 14-114A and 14-114B. That way, the size of the first optical members 14-115A and 14-115B may be reduced without affecting the optical properties, and the miniaturization of the optical system 14-102 can be achieved. In addition, in response to the larger fourth optical member 14-143, the original size (i.e. the size when the optical member is uncut) of the first optical member 14-115A in the optical system 14-102 may be larger than the original size of the first optical member 14-114A in the optical system 14-101, as shown as the dotted lines.

In the present embodiment, the first optical members 14-115B and 14-115C are closer to the third optical module 14-130 than the first optical member 14-115A. For example, the material of the first optical member 14-115A includes glass, and the material of the first optical members 14-115B and 14-115C includes plastic, but they are not limited thereto. In some embodiments, the refractive index of the material of the first optical members 14-115B and 14-115C is smaller than the refractive index of the material of the first optical member 14-115A.

The second optical module 14-120 is connected to the second optical members 14-122A and 14-122B with different sizes. The second optical member 14-122A has a second optical area 14-A23, and the second optical member 14-122B has a second optical area 14-A24. In this embodiment, the first optical areas 14-A11 and 14-A12 is substantially equal to the second optical area 14-A24. The second optical members 14-122B also has at least one cutting portion to reduce the size of the second optical members 14-122B, and the miniaturization of the optical system 14-102 can be achieved.

It should be understood that although three first optical members 14-115A, 14-115B, 14-115C and two second optical members 14-122A and 14-122B are shown in the present embodiment, but the present disclosure is not limited thereto. Those skilled in the art may adjust positions and numbers of the first optical members and the second optical members as required, as long as the number of the first optical members is greater than the number of the second optical members. In addition, a plurality of third optical modules may be disposed in the optical system in some embodiments, and at least one first optical member or at least one second optical member is disposed between the third optical modules As set forth above, the embodiments of the present disclosure provide an optical system including a plurality of optical members, wherein some of the optical members are movable relative to some of the other optical members. Since some of instead all of the optical members are movable, the design of the driving assembly may be simplified or the required space of the driving assembly may be reduced, achieving the miniaturization of the optical system.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical system, comprising:
    a first optical module connected to a plurality of first optical members, wherein the first optical members comprises a first lens, a second lens, and a third lens, an optical area of the first lens is equal to an optical area of the second lens, the optical area of the second lens is greater than an optical area of the third lens, and at least one of the first optical members is cut;
    a second optical module connected to at least one second optical member; and
    a third optical module connected to a third optical member, wherein the third optical module is located between the first optical module and the second optical module.

2. The optical system as claimed in claim 1, wherein there are fewer first optical members than second optical members.

3. The optical system as claimed in claim 2, wherein the first optical members each have a first optical area on a plane that is perpendicular to an optical axis, the second optical member has a second optical area on the plane, and the first optical area is different from the second optical area.

4. The optical system as claimed in claim 3, wherein the third optical member has a third optical area on the plane, and the third optical area is smaller than the first optical area and the second optical area.

5. The optical system as claimed in claim 4, further comprising a fourth optical module connected to a fourth optical member, wherein the first optical module is located between the third optical module and the fourth optical module, the fourth optical member has a fourth optical area on the plane, and the fourth optical area is greater than at least one of the first optical area and the second optical area.

6. The optical system as claimed in claim 5, wherein the fourth optical member has a first area on a plane that is perpendicular to the optical axis and has a second area on a plane that is parallel to the optical axis, and the first area is smaller than the second area.

7. The optical system as claimed in claim 6, wherein the second area is greater than the second optical area.

8. The optical system as claimed in claim 1, wherein one of the first optical members has a first material, another first optical member has a second material, and the first material is different from the second material.

9. The optical system as claimed in claim 8, wherein the one of the first optical members is closer to the third optical module than the other first optical member, and the refractivity of the first material is less than the refractivity of the second material.

10. The optical system as claimed in claim 1, wherein there are more first optical members than second optical members.

11. The optical system as claimed in claim 10, wherein the first optical members each have a first optical area on a plane that is perpendicular to an optical axis, the second optical member has a second optical area on the plane, and the first optical area is greater than the second optical area.

12. The optical system as claimed in claim 11, wherein the third optical member has a third optical area on the plane, and the third optical area is smaller than the first optical area.

13. The optical system as claimed in claim 12, further comprising a fourth optical module connected to a fourth optical member, wherein the first optical module is located between the third optical module and the fourth optical module, the fourth optical member has a fourth optical area on the plane, and the fourth optical area is greater than at least one of the first optical area and the second optical area.

14. The optical system as claimed in claim 13, wherein the fourth optical member has a first area on a plane that is perpendicular to the optical axis and has a second area on a plane that is parallel to the optical axis, and the first area is smaller than the second area.

15. The optical system as claimed in claim 14, wherein the second area is greater than the second optical area.

16. The optical system as claimed in claim 1, wherein one of the first optical members has a first material, another first optical member has a second material, and the first material is different from the second material.

17. The optical system as claimed in claim 16, wherein the one of the first optical members is closer to the third optical module than the other first optical member, and the refractivity of the first material is less than the refractivity of the second material.

18. The optical system as claimed in claim 16, wherein the shape of the first optical members is not exactly the same.

19. The optical system as claimed in claim 1, wherein the first optical module is movable relative to the second optical module, and the third optical module is connected to the first optical module.

20. The optical system as claimed in claim 1, wherein the first optical module is movable relative to the second optical module, and the third optical module is connected to the second optical module.

* * * * *